United States Patent
Wallace et al.

(10) Patent No.: US 9,359,147 B2
(45) Date of Patent: Jun. 7, 2016

(54) PIPE BELT ORIENTATION MONITORING

(71) Applicants: Jack Bruce Wallace, Powell, OH (US); Jacques Frederick Basson, Durban (ZA)

(72) Inventors: Jack Bruce Wallace, Powell, OH (US); Jacques Frederick Basson, Durban (ZA)

(73) Assignee: Covititech Transportbandsysteme, Hannover (DE)

( * ) Notice: Subject to any disclaimer, the term of this patent is extended or adjusted under 35 U.S.C. 154(b) by 0 days.

(21) Appl. No.: 14/844,741

(22) Filed: Sep. 3, 2015

(65) Prior Publication Data

US 2016/0068350 A1 Mar. 10, 2016

Related U.S. Application Data

(60) Provisional application No. 62/046,461, filed on Sep. 5, 2014.

(51) Int. Cl.
*B65G 43/00* (2006.01)
*B65G 43/02* (2006.01)

(52) U.S. Cl.
CPC ..................... *B65G 43/02* (2013.01)

(58) Field of Classification Search
CPC ................. B65G 39/16; B65G 43/00
USPC ........................ 198/810.03, 810.02
See application file for complete search history.

(56) References Cited

U.S. PATENT DOCUMENTS

| | | | |
|---|---|---|---|
| 4,621,727 A | 11/1986 | Strader | 198/810.02 |
| 4,854,446 A | 8/1989 | Strader | 198/810.02 |
| 5,161,675 A | 11/1992 | Engst et al. | 198/810 |
| 6,247,514 B1 | 6/2001 | Kim et al. | 152/556 |
| 6,702,103 B1 | 3/2004 | Kusel | 198/810.03 |
| 6,712,199 B1 | 3/2004 | Bruckner | 198/810.03 |
| 6,715,602 B1 | 4/2004 | Gartland | 198/810.02 |
| 7,740,128 B2 | 6/2010 | Wallace et al. | 198/618 |
| 7,740,130 B2 | 6/2010 | Wallace et al. | 198/810.02 |
| 7,810,634 B2 | 10/2010 | Wallace et al. | 198/810.02 |
| 7,894,934 B2 | 2/2011 | Wallace et al. | 700/230 |
| 8,069,975 B2 | 12/2011 | Wallace | 198/810.02 |
| 8,074,789 B2 * | 12/2011 | May | B65G 43/02 198/810.02 |
| 8,157,085 B2 | 4/2012 | Furukawa | 198/810.03 |

* cited by examiner

*Primary Examiner* — James R Bidwell
(74) *Attorney, Agent, or Firm* — Alvin T. Rockhill

(57) ABSTRACT

As a tubular conveyor belt advances through a conveyor system longitudinal rips can be detected and the orientation of the belt can be monitored, wherein the tubular conveyor belt has a width, a length, a longitudinal centerline, a first longitudinal edge, an opposing second longitudinal edge, and a load bearing region, wherein during use the first longitudinal edge and the second longitudinal edge overlap to form an overlap region forming the belt into a tube-like shape, wherein the load bearing region is located evenly about the belt longitudinal centerline throughout the length of the belt; this method comprising monitoring the position of the centerline by detecting the position of a plurality of equally spaced magnetically permeable elements embedded therein, wherein the magnetically permeable elements are situated across the width of the load bearing region of the tubular conveyor belt.

22 Claims, 3 Drawing Sheets

PIPE BELT ORIENTATION MONITORING

This application claims the benefit of U.S. Provisional Patent Application Ser. No. 62/046,461, filed on Sep. 5, 2014. The teachings of U.S. Provisional Patent Application Ser. No. 62/046,461 are incorporated herein by reference in their entirety.

BACKGROUND OF THE INVENTION

Pipe conveyors, also referred to as tube conveyors, are conveyor belts which are loaded with a material to be conveyed and after being loaded are closed into the conformation of a tube by mechanical means to force the conveyor into a closed tube by overlapping the belt edges. After being closed into the form of a tube the material being conveyed is protected from external elements and is also contained within the tube to in help prevent loss of the material being conveyed. In any case, a plurality of support and guide assemblies for the conveyor are situated along the conveyor path to open and close the conveyor as desired at different points along the path of the conveyor. Each assembly includes a plurality of support and guide rollers, which contact and hold the pipe conveyor belt while in operation.

Pipe belts are predominantly employed where bulk material is conveyed in a relatively confined space through horizontal and vertical curves. By virtue of their special adaptability to various topographical conditions, pipe belt conveyor systems are also used for conveying material over distances longer than 1 kilometer. The advantages offered by pipe belts include protection of the transported material against environmental influences (rain, wind, etc.) and protection of the environment against material dropping from the conveyor belt (ashes from power plants; gypsum etc.). In some cases pipe belts also protect the material being transported for theft by employees and third parties that may be present in the area through which the material is being conveyed.

Pipe conveyor belts are prone to running off course or twisting under certain operating conditions. Belts may twist because of uneven loading, uneven guidance through curves, or otherwise poorly aligned systems. Support and guide rollers are optimally designed to provide for trouble-free and low maintenance operation as the pipe belt travels through the conveyor system. Said rollers are individually aligned depending upon the course that the conveyor system is running. The functionality of said rollers is influenced by varying weather and temperature conditions, wear, and design defects. For example, moisture reduces friction between the rollers and the conveyor belt, which results in guidance that is not optimal. If the pipe conveyor belt is misaligned or twisted, for example as it is running up on an ejecting drum, the conveyor belt can fold or even run off of the drum sideways.

Many pipe belts include metal reinforcements to make the pipe belt stronger and to increase its durability. These reinforcements can cause the overlap section of the belt to be heavier than the rest of the belt, since there are two reinforced areas sitting on top of one another. This top heavy design can cause the belt to rotate as the belt encounters horizontal or vertical curves. Such a rotation of the pipe belt can lead to substantial belt damage and loss of the material being conveyed. Accordingly, undesired rotation of the pipe conveyor belt should be avoided and the problem should be corrected as soon as possible to limit prevent or minimize damage to the system and loss of material.

Some of the technology disclosed in the prior art forcibly guides the conveyor belt over finger rollers projecting into the cross section of the pipe belt. This guidance method is afflicted with the substantial drawback that the conveyor belt can be damaged by the finger rollers. Consequently, this method does not represent a totally satisfactory or permanent solution to the aforementioned problems associated with undesired rotation of pipe conveyor belts within conveyor systems.

For these reasons, there is a need for a system to monitor the orientation of pipe belts as they travel through conveyor systems for undesired rotation to correct problems associated with unwanted rotation of the belt before substantial damage or loss of material occurs. It is also desirable to monitor such pipe belts for other types of belts damage, such as rips and tears, to minimize damage.

U.S. Pat. No. 6,702,103 discloses a device for monitoring a tubular belt conveyor system, comprising the following: a conveyor belt consisting of an elastomeric material, especially with embedded tie rods, the conveyor belt being closed to form a tubular belt by overlapping its longitudinal edges so as to form an overlap area; other system parts, i.e., a driving drum, a tail pulley, support rollers, guide rollers, supporting structures and optionally, other parts. The inventive device is characterized in that the device for monitoring the overlap area of the tubular belt is provided with an optoelectronic system. In the event of a deviation from the desired conveyor belt overlap, the optoelectronic system initiates a correction of position by means of the guiding rollers. If the corrective measures are not taken within a certain period, the tubular belt conveyor system is automatically disconnected.

U.S. Pat. No. 6,712,199 describes a device for controlling and monitoring a conveyor belt which is made of rubber or a rubber-like plastic material and preferably provided with embedded reinforcements. By overlapping of the longitudinal edges of the conveyor belt the belt can be closed such that it forms a tubular conveyor belt which is supported on all sides by idler wheels. The device also comprises at least the following components: at least one detectable element which is integrated into the conveyor belt and notably takes the form of several elements which in the longitudinal and/or transverse direction are positioned at distances from each other; and at least one scanning unit with which the precise position of the belt can be determined in a non-contacting manner by detection of the element or elements. The device provided for by the invention is characterized in that the detectable element is an induction loop and/or a transponder, a metal particle or a permanent magnet. The scanning unit is advantageously configured as a system of several detector elements which form a detector chain.

U.S. Pat. No. 8,157,085 discloses a device for monitoring a conveyor belt in which a sensor can be fixed easily to the body without using any special fixing device and the properties of the conveyor belt can be detected with high precision. The device for monitoring the conveyor belt comprises a body to be detected embedded in a conveyor belt running endlessly, and a sensor provided oppositely thereto in the body. The sensor detects the variation in properties of the conveyor belt by detecting variation of the body to be detected due to the variation in properties of the conveyor belt. The sensor is secured to a shaft which supports a hollow roller for guiding the conveyor belt in the conveyance direction rotatably on the body in the roller thus making the sensor itself nonrotatable.

U.S. Pat. No. 5,161,675 teaches a tubular belt conveyor system includes a conveyor belt having a cross-sectionally closed, curvilinear, tubular configuration including a zone of overlapping edge portions. A plurality of support and guide assemblies for the conveyor are situated along the conveyor path. Each assembly includes a plurality of support and guide rollers held about the cross-sectionally closed conveyor belt in a contacting relationship therewith. In each assembly one roller is in engagement with the cross-sectionally closed conveyor belt at the edge overlap. The closed tubular configuration in each length portion of the conveying path has an oval cross section. The support and guide rollers force the conveyor belt into the closed tubular configuration of oval cross section. The first support and guide roller of each assembly is settable onto the zone of overlapping edge portions.

SUMMARY OF THE INVENTION

The method of the present invention is useful for efficiently monitoring and detecting deviations in the orientation of a pipe belt, such as undesired rotation, as it travels through a conveyor system. During normal operations a pipe belt is mechanically folded into a tubular shape with the overlapping portion at the top of the belt, and the load carrying portion at the bottom of the belt; directly underneath the overlapping portion. Any deviation from this ideal position can pose a significant risk to the conveyor system and to the materials being transported by the conveyor system. An objective of this invention to meet that need is by accurately and efficiently detecting pipe belt rotation and longitudinal tears in fabric pipe belts and transverse deterioration in steel cable belts by monitoring cord damage and splice deformation.

The methods of this invention are effective in either fabric or steel cord reinforced pipe belts. Different embodiments of this invention utilize a pipe belt containing a multitude of rip detection inserts, or magnetically permeable elements, or identification tags which generate a radio frequency signal. The locations of these inserts or devices are measured at intervals to monitor the belt's position during operation, and are useful for promptly issuing an alert, such as by notifying an operator, of any damaging event or unusual rotation of the belt.

The present invention more specifically discloses a method for detecting longitudinal rips and monitoring the belt orientation of a tubular conveyor belt as the conveyor belt advances through a conveyor system, wherein said tubular conveyor belt has a width, a length, a longitudinal centerline, a first longitudinal edge, an opposing second longitudinal edge, and a load bearing region, wherein during use said first longitudinal edge and said second longitudinal edge overlap to form an overlap region forming the belt into a tube-like shape of a defined diameter, wherein said load bearing region is generally located about the longitudinal centerline of the belt throughout the length of the belt; said method comprising monitoring the position of the centerline by detecting the position and integrity of a plurality of equally spaced magnetically permeable elements embedded therein, wherein the magnetically permeable elements are situated across the width of the load bearing region of the tubular conveyor belt.

DETAILED DESCRIPTION OF THE INVENTION

The pipe conveyor belts of this invention have an elastomeric body with a load carrying surface located on the top surface, or internal surface rolled within the elastomeric body. These belts may also include rip inserts, spaced incrementally along the length of the pipe conveyor belt to monitor the belt while it is in a tube formation. In another embodiment of this invention the pipe belt can include steel reinforcing elements which are used to as the magnetically permeable material within the belt to monitor for rotation of the belt from its normal position during ordinary operation.

The tubular conveyor belt of this invention will have a width, a length, a longitudinal centerline, a first longitudinal edge, an opposing second longitudinal edge, and a load bearing region. During use said first longitudinal edge and said second longitudinal edge can overlap to form an overlap region forming the belt into a tube-like shape. The load bearing region is located evenly about the belt longitudinal centerline throughout the length of the belt. In the practice of this invention the position of the centerline is monitored by detecting the position of a plurality of equally spaced magnetically permeable elements embedded in the belt. These magnetically permeable elements are situated across the width of the load bearing region of the tubular conveyor belt.

The elastomeric body will normally include plies of fabric or reinforcing steel cables that typically run longitudinally within the pipe conveyor belt. The pipe belts which can be monitored in accordance with this invention can also optionally also contain conventional inductive belt damage sensor loops including embedded transducer elements. In any case, conventional rip detection systems can be used in conjunction with the method and system of this invention. In fact, the magnetically permeable material used in such rip detection systems can serve the additional purpose of serving as the magnetically permeable material for detecting undesired rotation of the belt in accordance with this invention. In any case, such rip detection systems are disclosed in U.S. Pat. No. 4,621,727, U.S. Pat. No. 4,854,446, and U.S. Pat. No. 6,715, 602. The teachings of U.S. Pat. No. 4,621,727, U.S. Pat. No. 4,854,446, and U.S. Pat. No. 6,715,602 are incorporated herein by reference for the purpose of disclosing conventional rip detection and identification systems that can be used in conjunction with this invention.

Figure 2:
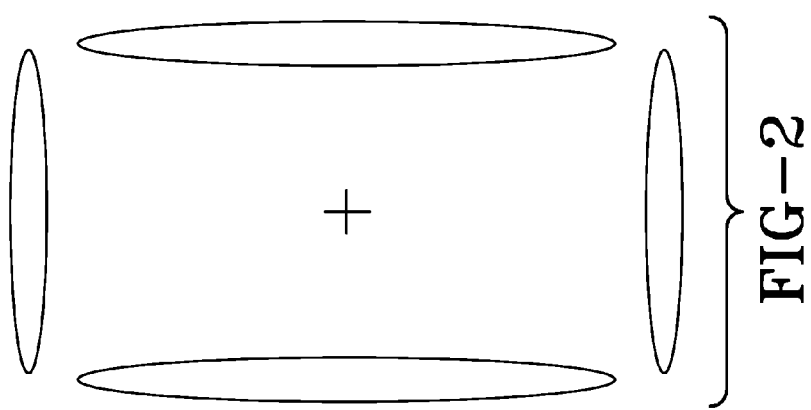
FIG. 2 illustrates the magnetic field image of the rip detection insert shown in FIG. 1 (without belt damage).
Figure 1:
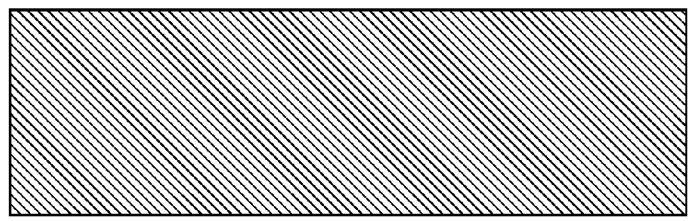
FIG. 1 is a schematic cross-sectional view of a rip detection insert of this invention showing a plurality of rip detection wires therein wherein the rip detection insert has not be subjected to belt damage.

In one embodiment of this invention a pipe belt with a rip detection insert as depicted in FIG. 1 is utilized. FIG. 1 shows a plurality of rip detection wires within a rip detection insert wherein the rip detection insert has not been subjected to belt damage. These rip detection inserts are spaced along the longitudinal length of the pipe conveyor belt. The rip detection inserts contain a multitude of rip detection wires that are comprised of a magnetically permeable material, such as a ferromagnetic material. For instance, the rip detection wires can be brass plated steel tire cords. It is advantageous for the rip detection wires to be steel filaments having a diameter within the range of 0.1 mm to about 0.6 mm and preferably for the filaments to have a diameter within the range of 0.2 min to 0.4 mm. It is also advantageous for the filaments to be wound into wire bundles comprising from 2 to about 12 filaments or even about 18. The rip detection wires can be tire cords having a wide variety of constructions with or without a spiral wrap. Some representative examples of constructions that can be used include 2×, 3×, 4×, 5×, 6×, 7×, 8×, 11×, 12×, 1+2, 1+3, 1+4, 1+5, 1+6, 1+7, 1+8, 2+1, 2+2, 2+7, 2+8, 2+9, 2+10, 3+1, 3+2, 3+3, and 3+9. A more detailed description of steel tire cords containing up to 12 filaments that can be advantageously used as rip detection wires in the practice of this invention is provided in U.S. Pat. No. 6,247,514. The teachings of U.S. Pat. No. 6,247,514 are incorporated by reference herein for the purpose of describing suitable steel tire cords that contain up to 12 filaments.

Figure 4:
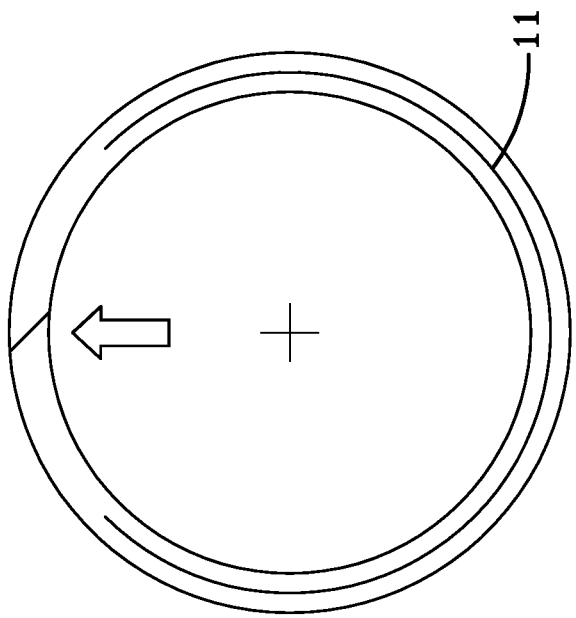
FIG. 4 is a cross section of the pipe conveyor belt in improper orientation with the overlapping region at the bottom.
Figure 3:
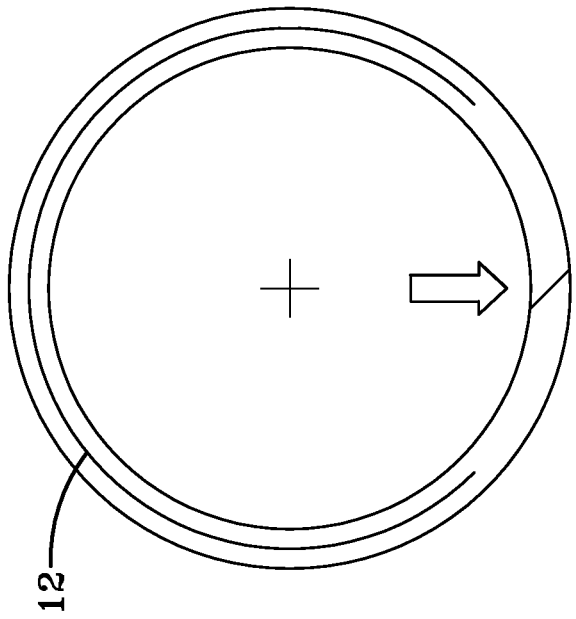
FIG. 3 is a cross section of the pipe conveyor belt in good orientation with the overlapping region at the top.

The rip detection wires are typically aligned in the rip detection inserts at a bias angle α of 15° to 75° from being perpendicular to the longitudinal direction of the belt. The rip detection wires are more typically aligned in the rip detection inserts at a bias angle α of 30° to 60° and are preferably aligned in the rip detection inserts at a bias angle α of 40° to 50°. In this embodiment of the subject invention the rip detection wires 11 and 12 are spaced incrementally across the width of the belt with them being in a proper orientation as illustrated in FIG. 3 and an improper orientation as illustrated in FIG. 4. Normally individual rip detection wires do not extend across more than about 70% of the width of the belt. In most cases individual rip detection wires do not extend across more than about 50% of the width of the belt. More typically individual rip detection wires do not extend across more than about 40% or even 30% of the width of the belt.

Figure 6:
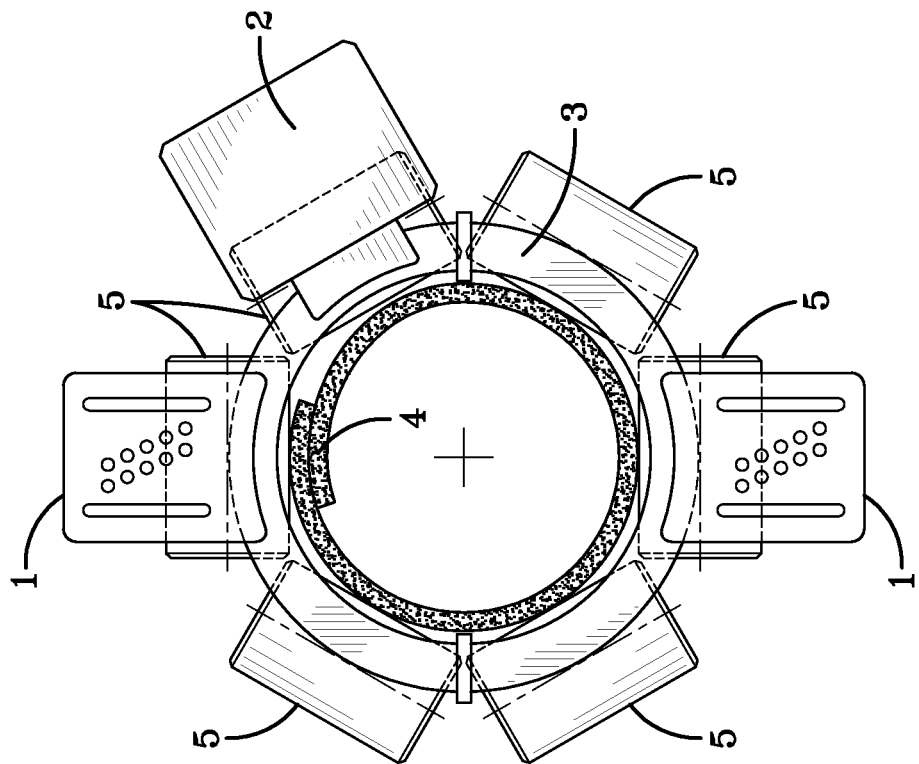
FIG. 6 depicts a sensor array, pipe conveyor belt, and idlers.
Figure 5:
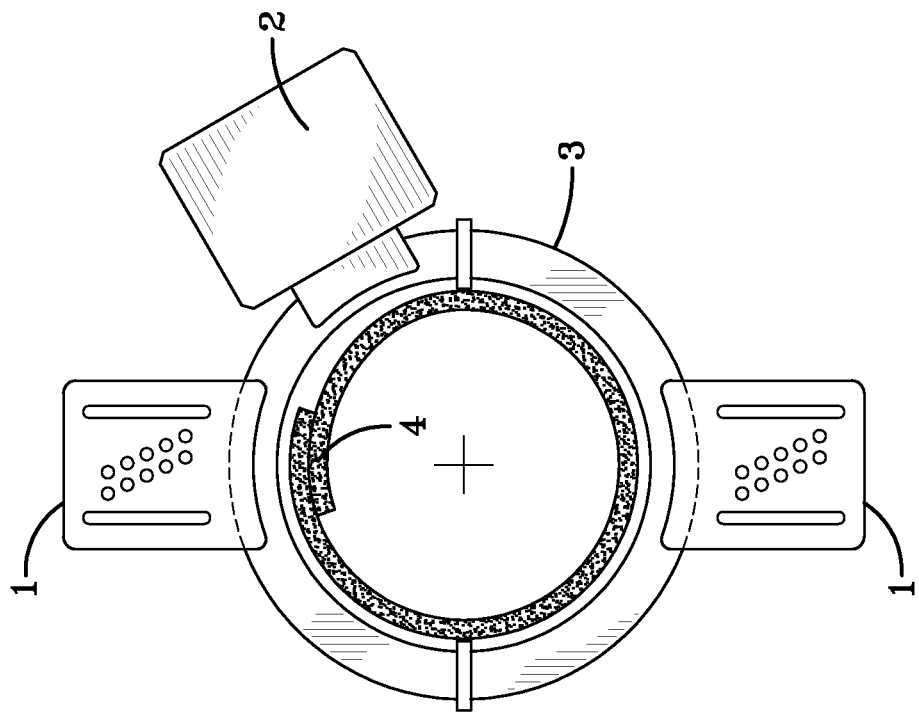
FIG. 5 depicts a sensor array, pipe conveyor belt.

FIGS. 5-6 show one embodiment of this invention, depicting a plurality of fixtures 1 which hold the sensor array 3 in place. The pipe conveyor belt 4 is shown in a folded, tubular position and passing through the sensor array 3. The centerline of the pipe conveyor belt is normally also the center of the load bearing region of the pipe belt and this centerline can be monitored as a function of the degree of rotation of the centerline relative to the lowest vertical position of a cross-section of the belt at the point in the conveyor system where the belt is being monitored. Typically, in normal operations this centerline will be located in an orientation which is essentially directly underneath the overlapping region of the pipe conveyor belt when the belt is in an ideal orientation. The belt will contain a plurality of equally spaced magnetically permeable elements located at the center point and across the length of the load bearing region. As the belt passes through the sensor array 3, the magnetic elements are used to detect the centerline of the load bearing region of the belt. A central processing unit 2 attached to the sensor array 3 will monitor the orientation of the pipe conveyor belt 4, and alert operators when the belt is outside of an acceptable operating positional range (as illustrated in FIG. 4) or is otherwise not oriented in an ideal position (as illustrated by FIG. 3). FIG. 6 includes these same showings, while additionally showing the positions of numerous idlers 5 which guide the pipe conveyor belt through the sensor array 3 and throughout the conveyor system.

The teachings of U.S. Pat. No. 8,069,975, U.S. Pat. No. 7,894,934, U.S. Pat. No. 7,810,634, U.S. Pat. No. 7,740,128, and U.S. Pat. No. 7,740,130 are hereby incorporated herein by reference for the purpose of teaching belts and systems that can be used in conjunction with this invention for detecting belt damage, such as tears and rips. The teachings of U.S. Pat. No. 8,069,975, U.S. Pat. No. 7,894,934, U.S. Pat. No. 7,810, 634, U.S. Pat. No. 7,740,128, and U.S. Pat. No. 7,740,130 are also hereby incorporated by reference for the purpose of teaching magnetically permeable materials, such as steel cords and rip detection inserts which can be employed in conjunction with this invention as magnetically permeable material for monitoring the orientation of the pipe belt as it travels through the conveyor system of this invention.

While certain representative embodiments and details have been shown for the purpose of illustrating the subject invention, it will be apparent to those skilled in this art that various changes and modifications can be made therein without departing from the scope of the subject invention.

What is claimed is:

1. A method for detecting longitudinal rips and monitoring the belt orientation of a tubular conveyor belt as the conveyor belt advances through a conveyor system, wherein said tubular conveyor belt has a width, a length, a longitudinal centerline, a first longitudinal edge, an opposing second longitudinal edge, and a load bearing region, wherein during use said first longitudinal edge and said second longitudinal edge overlap to form an overlap region forming the belt into a tube-like shape of defined diameter, wherein said load bearing region is generally located about the longitudinal centerline of the belt throughout the length of the belt; said method comprising monitoring the position of the centerline by detecting the position and integrity of a plurality of equally spaced magnetically permeable elements embedded therein, wherein the magnetically permeable elements are situated across the width of the load bearing region of the tubular conveyor belt.

2. The method as specified in claim 1 wherein the tubular conveyor belt is reinforced with fabric reinforcements and has an inner surface and outer surface.

3. The method as specified in claim 1 wherein the tubular conveyor belt has an inner surface, a reinforced layer that is reinforced by magnetically permeable metal cords embedded therein and an outer surface.

4. The method as specified in claim 3 wherein the magnetically permeable metal cords are monitored to detect cord damage and/or splice integrity.

5. The method of claim 4 wherein the tubular conveyor belt is monitored by a plurality of magnetic reference points as a function of belt position using a pulse device with a control unit in communication with a belt monitor which is operable to assess damage events as well as detect locations of such damage events relative to a magnetic reference point from among the plurality of magnetic reference points including a single splice or multiple splices from amongst a plurality of splices.

6. The method of claim 5 wherein the control unit is further operable to determine that the damage event is or is not a critical damage event, and wherein the system further comprises: a suitable alarm provided in response to identifying the damage event; and an display to notify an operator of the monitoring system of recommended actions and the location of the damage event.

7. The method as specified in claim 1 wherein the magnetically permeable elements are rip detection inserts spaced along the longitudinal length of the tubular conveyor belt, wherein the rip detection inserts contain a multitude of rip detection wires that are comprised of the magnetically permeable material that can be magnetically imaged over the width of the conveyor belt.

8. The method of claim 7 wherein the rip detection inserts are spaced along the longitudinal length of the conveyor belt, wherein the rip detection inserts contain a multitude of rip detection wires that are comprised of the magnetically permeable material, wherein the rip detection wires are aligned in the rip detection inserts at a bias angle of 15° to 75° from being perpendicular to the longitudinal direction of the belt, wherein the rip detection wires are spaced incrementally across the width of the belt, and wherein individual rip detection wires do not extend across more than about 70% of the width of the belt.

9. The method of claim 7 wherein images of the magnetic field associated with a plurality of the rip detection inserts are monitored as a function of belt position for magnetic changes associated with the generation of new magnetic polarities being generated by damaged rip detection wires.

10. The method of claim 8 wherein an alarm is triggered in the event that deviations such as subdivisions into multiple sub-panel segments in the magnetic images are detected.

11. The method of claim 8 wherein localized regions of damaged rip insert wires can be filtered in order to continue monitoring using undamaged regions of the rip detection insert.

12. The method as specified in claim 1 wherein the position of the magnetically permeable elements are used to determine the orientation of the tubular conveyor belt.

13. The method as specified in claim 1 wherein the position of the centerline is monitored as a function of the degree of rotation of the centerline relative to a fixed point on a sensor array mounted on the conveyor system where the tubular conveyor belt is being monitored.

14. The method as specified in claim 12 wherein an alert is given in cases wherein the position of the centerline deviates beyond a predetermined angle relative to a fixed position at the point in the conveyor system where the tubular conveyor belt is being monitored.

15. The method as specified in claim 13 wherein an alert is given in cases wherein the position of the centerline deviates a beyond predetermined angle from the fixed position of a cross-section of the belt at the point in the conveyor system where the tubular conveyor belt is being monitored.

16. The method as specified in claim 1 wherein the position of the centerline is monitored as a function of the degree of rotation of the centerline relative to the lowest vertical position of a cross-section of the belt at the point in the conveyor system where the tubular conveyor belt is being monitored.

17. The method as specified in claim 15 wherein the position of the centerline is monitored as a function of the degree of rotation of the centerline relative to the lowest vertical position of a cross-section of the belt at the point in the conveyor system where the tubular conveyor belt is being monitored.

18. The method as specified in claim 16 wherein an alert is given in cases wherein the position of the centerline deviates beyond a predetermined angle from being situated directly above the lowest vertical position of a cross-section of the belt at the point in the conveyor system where the tubular conveyor belt is being monitored.

19. The method of claim 1 wherein when said conveyor belt is formed into said tube-like shape, said tube-like shape has a top and a bottom, wherein a centerline passes through said bottom, and wherein said longitudinal reinforcement members in said first and second longitudinal edge are symmetrical about said centerline passing through the bottom of the conveyor belt.

20. The method of claim 1 wherein when said conveyor belt is formed into said tube-like shape of a given diameter, said tube-like shape has a top and a bottom, wherein a centerline passes through said bottom, and wherein said longitudinal reinforcement members in said first and second longitudinal edge are not symmetrical about said centerline passing through the bottom of the conveyor belt.

21. The method of claim 1 wherein when said conveyor belt is formed into said tube-like like shape of a given diameter, said tube-like shape has a top and a bottom, wherein a centerline passes through said bottom, wherein said load bearing region is symmetrical about said centerline passing through the bottom of the conveyor belt.

22. The method of claim 1 wherein the movement of the tubular conveyor belt is monitored with a tachometer, pulse device or encoder as it moves through the conveyor system, wherein a sensor array is longitudinally spaced from the magnet and configured to measure a magnetic field of the at least one cord, and which further comprises operating the control unit to identify the damage event based on the measured magnetic field of the at least one cord.

\* \* \* \* \*